United States Patent
Eisenreich et al.

(10) Patent No.: US 7,963,583 B2
(45) Date of Patent: Jun. 21, 2011

(54) TOP FOR A CONVERTIBLE VEHICLE

(75) Inventors: Markus Eisenreich, Plattling (DE); Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 115 days.

(21) Appl. No.: 11/343,333

(22) Filed: Jan. 31, 2006

(65) Prior Publication Data
US 2007/0035154 A1  Feb. 15, 2007

(30) Foreign Application Priority Data

Jan. 31, 2005 (DE) .................. 10 2005 004 503
Feb. 23, 2005 (DE) .................. 10 2005 008 564

(51) Int. Cl.
*B60J 7/00* (2006.01)

(52) U.S. Cl. ................................. 296/107.01

(58) Field of Classification Search ... 296/107.01–107.2
See application file for complete search history.

(56) References Cited

U.S. PATENT DOCUMENTS

| | | | |
|---|---|---|---|
| 5,459,962 A | 10/1995 | Bonne et al. | |
| 5,654,615 A * | 8/1997 | Brodsky | 318/282 |
| 6,483,612 B2 | 11/2002 | Walker | |
| 6,600,284 B1 | 7/2003 | Weber et al. | |
| 6,701,673 B1 | 3/2004 | Kessler et al. | 49/506 |
| 6,768,566 B2 | 7/2004 | Walker | |
| 6,788,460 B2 | 9/2004 | Knox et al. | |
| 6,816,306 B2 | 11/2004 | Freese et al. | |
| 6,829,087 B2 | 12/2004 | Freese et al. | |
| 6,967,779 B2 | 11/2005 | Fadel et al. | |
| 2001/0001582 A1 | 5/2001 | Walker | |
| 2002/0159109 A1 | 10/2002 | Walker | |
| 2003/0038999 A1 | 2/2003 | Knox et al. | |
| 2003/0085679 A1 | 5/2003 | Bledin et al. | |
| 2003/0206342 A1 | 11/2003 | Reed et al. | |
| 2003/0210462 A1 | 11/2003 | Freese et al. | |
| 2003/0211797 A1 * | 11/2003 | Hill et al. | 442/205 |
| 2003/0233183 A1 | 12/2003 | Nuber | |
| 2003/0233790 A1 | 12/2003 | Nuber | |
| 2004/0017171 A1 | 1/2004 | Staus | |
| 2004/0017612 A1 | 1/2004 | Fadel et al. | |
| 2004/0188875 A1 | 9/2004 | Knox et al. | |
| 2006/0139036 A1 * | 6/2006 | Gutendorf | 324/686 |

FOREIGN PATENT DOCUMENTS

| | | |
|---|---|---|
| DE | 35 27 405 A1 | 2/1987 |
| DE | 40 04 353 | 8/1991 |
| DE | 44 16 803 A1 | 11/1994 |
| DE | 93 21 338 U1 | 6/1995 |

(Continued)

*Primary Examiner* — Glenn Dayoan
*Assistant Examiner* — Melissa A Black
(74) *Attorney, Agent, or Firm* — Davidson, Davidson & Kappel, LLC

(57) ABSTRACT

The invention relates to a system for sensing an object in the pivoting range of a top for a convertible vehicle, the system comprising an electrode for sensing field properties of a field which is assigned to the top, and an evaluation unit for evaluating the sensed field properties. The invention further relates to a method for sensing a top of a convertible vehicle which is moved by a drive, comprising the steps: sensing of a field between the top of the convertible vehicle and the bodywork during movement of the top of the convertible vehicle, adjusting of the sensed characteristic variables to setpoint values, and acting on the drive as a function of the sensed characteristic variables of the field and of the setpoint values.

33 Claims, 9 Drawing Sheets

FOREIGN PATENT DOCUMENTS

| | | |
|---|---|---|
| DE | 42 15 744 C2 | 9/1997 |
| DE | 198 36 056 | 2/2000 |
| DE | 102 20 725 C1 | 4/2003 |
| DE | 102 20 187 | 11/2003 |
| DE | 102 26 133 | 1/2004 |
| DE | 198 18 650 B4 | 2/2004 |
| DE | 102 48 761 | 5/2004 |
| DE | 103 05 342 | 9/2004 |
| DE | 103 28 930 A1 | 1/2005 |
| EP | 0 856 425 | 8/1998 |
| WO | WO 2004/001438 | 12/2003 |

* cited by examiner

TOP FOR A CONVERTIBLE VEHICLE

Priority is claimed to German Patent Application 10 2005 004 503, filed on Jan. 31, 2005, and to German Patent Application 10 2005 008 564, filed on Feb. 23, 2005, the entire disclosure of which is incorporated by reference herein.

BACKGROUND OF THE INVENTION

The invention relates to a system for a convertible vehicle in general and in particular to an anti-trapping sensor for sensing an object in the pivoting range of a top of a convertible vehicle. The invention further relates to a method for sensing a top of a convertible vehicle which is moved by a drive.

From practice it is known to assign sensors to a top of a convertible vehicle, which top is mounted on a bodywork of a motor vehicle in such a way that it can be moved, in particular pivoted, and which passes through a pivoting range during the movement, said sensors monitoring the top during the movement and what are referred to as anti-trapping sensors, which sense whether between the top of the convertible vehicle and the bodywork there are objects which could be trapped when the top of the convertible vehicle comes to rest on the bodywork are known in the pivoting range of the top for a convertible vehicle. It is also known to provide anti-trapping sensors between linkage parts of the top for a convertible vehicle which can be moved in relation to one another, for example between two roof links which are rotatably coupled to one another or folding roof bows which are guided by the roof links, with the roof links or bows which are coupled to one another carrying out scissor-like rotational movement when the top comes to rest so that an object could be trapped between the roof links and the bows.

German patent application DE 103 05 342 A1 describes a system and a method for sensing an object in the pivoting range of the top of a convertible vehicle. The system comprises here a top to which an electrode device for sensing electrical field properties is assigned and which comprises an evaluation unit for evaluating the sensing field properties. An electrode which is embodied as a wire and as a capacitive pickup, and which is completely assigned to the top, is described. One end of the wire is connected to a frequency-determining capacitor, with two oscillators generating an identical frequency provided that an object does not approach the wire. If an object enters the vicinity of the wire, the capacitance of a capacitor changes so that the two oscillators are detuned with respect to one another, with a low frequency signal being generated which is detected and evaluated in order to control a drive of the top. An electronic system which is connected downstream provides, in particular, the possibility of zero adjustment in order to rule out incorrect alarms and to counteract drifting between the two oscillators. The anti-trapping sensor is embodied here as a unit which is assigned to the top of the convertible vehicle and is independent of the top of the convertible vehicle. The top of the convertible vehicle serves here essentially only as a carrier for the anti-trapping sensor to which said sensor is attached and by which the sensor is guided. It is disadvantageous that the wire is adapted specially to the geometry of the top and is to be provided as a component which is additional to the actual top of the convertible vehicle. It is also disadvantageous that if the wire is damaged or destroyed, it fails easily and supplies inaccurate results so that the system fails overall. It is also disadvantageous that the system for sensing the movement of the top is in its entirety inadequate to such an extent that the wire would have to surround all of the surface of the entire top, which requires a very complex design.

German patent application DE 102 48 761 A1 describes a sensor which measures in a capacitive fashion as an anti-trapping device for convertible-vehicle tops which are in particular operated automatically, with the sensor being constructed in a planar and film-like fashion with a carrier which is formed from film material, and with the dielectric being air. A detection device with an arrangement of four capacitive sensors, which are each embodied as a planar and film-like sensor and on which electrodes are arranged on a film material as carrier, is illustrated explicitly. In addition to the sensors which operate in a capacitive fashion, the detection device can also comprise sensors of other types, in particular optical sensors. It is disadvantageous that the sensors have to be provided in addition to the top for the convertible vehicle, thus constituting additional expenditure for the manufacture of the top for a convertible vehicle. The film-like sensors may prove susceptible to faults and wear in use over time. It is also unfavorable that the film-like sensors cause heat to accumulate in the interior of the convertible vehicle, which is problematic in particular in hot climatic conditions.

German patent application DE 198 36 056 A1 describes a capacitive detection device for a top for a convertible vehicle which can in particular be driven automatically, with the detection device comprising an electrically conductive transmitter surface on one side and a metal surface with a sensor wire on the other, an alternating current signal, which is tapped by the sensor wire and evaluated, being applied to the electrically conductive transmitter surface. Such a detection device is complex and also problematic in terms of insulation and visual concealment owing to the exposed metal face.

German patent application DE 40 04 353 A1 describes a proximity sensor as an anti-trapping device for window panes of motor vehicles having an ultrasonic sound sensor, infrared sensor, heat sensor or inductive sensor instead of a capacitive sensor. Such a proximity sensor is also hardly suitable for the top for convertible vehicles since the region to be monitored is very large, the top for a convertible vehicle describes a complicated movement sequence and the configuration or open-/closed-loop control of the sensors is very complex.

European patent application EP 0 856 425 A1 describes an anti-trapping device for window panes of motor vehicles having a capacitive sensor with a strain element in the form of a helical spring whose extension or compression changes an electrical resistance in such a way that a trapping situation can be sensed. It is disadvantageous that a trapping situation is not detected until the helical spring has experienced an appreciable extension or compression, that is to say not until a body part has already been trapped. Such an anti-trapping sensor which, in addition, is of complex design, is not suitable in view of the large forces which occur in tops of convertible vehicles.

German patent application DE 102 20 187 A1 describes a device for detecting an obstacle in an opening range of a movable closing element, in particular a motor-operated window pane or a sunroof, with a sealing profile being provided in which a sensor which senses an electric field is provided. The electric field is brought about by an electrical conductor which is fixed to the bodywork. As an alternative to the window pane, it is also possible to provide, as closing elements, a sunroof, a tailgate or a trunk lid; a top for a convertible vehicle is not explicitly specified. However, for a top for a convertible vehicle it is to be noted that its movement sequence is significantly more complicated than the simple linear or rotary movement of sunroofs or hinged flaps so that the described device cannot be readily transferred to tops for convertible vehicles.

German patent document DE 102 20 725 C1 describes a device for detecting an obstacle in an opening range of a movable closing element of a motor vehicle, in particular a motor-operated window pane with a sensor for an electric field, with the pane being insulated with respect to the sensor by means of conducting means in such a way that the moving pane does not influence the electric field and the changes in the electric field are essentially only due to obstacles so that the evaluation is simplified. In particular with respect to tops for convertible vehicles, it is disadvantageous that they have a significantly more complex movement sequence than an essentially linearly displaceable window pane so that insulation cannot be provided easily.

German patent application DE 102 26 133 A1 describes an arrangement for a device for detecting an obstacle in an opening range of a movable closing element, in particular an electrically driven window pane or a sunroof. The device comprises a sensor electrode which generates an electric field in the opening range and whose capacitive changes are sensed by an evaluation device. The sensor is described explicitly only for a window pane or for a sunroof and cannot be transferred to a top for a convertible vehicle without considerable expenditure.

SUMMARY OF THE INVENTION

It is an object of the invention to provide a system for an anti-trapping device which is of simple design and operationally reliable.

It is a further object of the invention to provide a system for an anti-trapping device which does not require additional elements or any significant conversion of already existing tops.

It is a still further object of the invention to provide a method for sensing a top for a convertible vehicle which is moved by a drive, which method is easy to carry out and which does not require any significant conversion of already existing tops for convertible vehicles.

It is a still further object of the invention to provide a system or a method for anti-trapping which is specifically suited for being employed in a top of a convertible vehicle.

According to the invention, these and further objects are achieved by a system for sensing an object in the pivoting range of a top for a convertible vehicle, the system comprising an electrode for sensing field properties of a field which is assigned to the top, and an evaluation unit for evaluating the sensed field properties, wherein, at least in certain sections, the top for the convertible vehicle is embodied directly as one of the electrodes, and wherein the section for the top of a convertible vehicle which is embodied as the at least one electrode has, with respect to the surroundings, a defined electrical state which can be sensed by the evaluation unit.

According to the invention, these and further objects are achieved by a system for sensing an object in the pivoting range of a top for a convertible vehicle, the system comprising a field which is assigned to the top, a sensor which senses properties of the field, and an evaluation unit for evaluating the sensed field properties, wherein the top for the convertible vehicle is embodied at least in certain sections as a field source, and wherein the field source can be sensed by the sensor while the top is pivoting.

According to another aspect of the invention, these and further objects are achieved by a method for sensing a top of a convertible vehicle which is moved by a drive, comprising the steps: providing a field between a top of a convertible vehicle and bodywork, sensing of the field between the top of the convertible vehicle and bodywork during movement of the top of the convertible vehicle, adjusting of the sensed characteristic variables to setpoint values, and acting on the drive as a function of the sensed characteristic variables of the field and of the setpoint values.

According to another aspect of the invention, these and further objects are achieved by a method for evaluation of an indirect field influence between a top and a bodywork of a convertible vehicle, said top and said bodywork being electrically insulated with respect to each other, wherein a generator producing a first signal indicative of said vehicle is assigned to one of said bodywork and said top, wherein an evaluation unit is assigned to the other of said bodywork and said top, and wherein the evaluation unit evaluates a field interaction responsive to a detected secondary signal correlative to said first signal and such determines a possible interference between an object not belonging to the vehicle and a pivoting range of said top.

Designing the convertible-vehicle top itself as an electrode makes it possible to dispense with additional elements such as, for example, the wire which is known in the prior art. As a result, already existing convertible-vehicle tops can be easily retrofitted without significant difficulties of conversion. Convertible-vehicle tops as such are much less sensitive to a change in the geometric shape than the abovementioned wire which can easily be bent so that the convertible-vehicle top which is designed as an electrode for the antitrapping sensor constitutes a particularly reliable and robust electrode.

Since it is already sufficient to embody convertible-vehicle tops in certain sections as one of the electrodes, in this respect there is a freedom of design which can be utilized for an optimized configuration of the electrodes. A second electrode which serves as a counterelectrode for the convertible-vehicle top and which is to be mounted outside the convertible-vehicle top and, with respect to which the field properties of the field assigned to the convertible-vehicle top, in particular a capacitance, are sensed, provides the advantage of being arranged either on the bodywork or outside the bodywork, for example at ground so that in this case a freedom of design is also obtained and this can be utilized for the purpose of sensing the object in the best possible way. Correspondingly it may be sufficient to configure the convertible-vehicle top as an electrode only in certain sections, for example if an anti-trapping device is to be formed between moving parts of the top, in particular between roof links and/or bows which are moved in relation to one another. For the anti-trapping device of the above-mentioned bow, the bow can be of electrically insulated design with respect to the other components of the top, in particular the adjacent bows or roof links; a ground cable can connect the insulated bow to the bodywork so that the bow, as a section of the top, is connected and embodied as its own anti-trapping device. The electrical insulation of the aforesaid bow can easily be formed by a non-conductive bushing made of PTFE so that tops which are already in existence can also be easily retrofitted. It is to be understood also that by applying a suitable insulation such assemblies which cannot be monitored within the scope of an anti-trapping device can be selectively excluded.

Designing the convertible-vehicle top in sections as a field source of a field between the convertible-vehicle top and the bodywork in order to sense an object in the pivoting range of the convertible-vehicle top within the scope of an anti-trapping device provides the possibility of contactless sensing of the object in real time. An object which has unexpectedly got into the pivoting range of the convertible-vehicle top, for example a user's hand, brings about a change in the field which can be sensed and can be used to control the movement of the convertible-vehicle top, for example by virtue of the fact that an optical and/or acoustic warning signal can be triggered. The change in the field thus permits contactless, unobtrusive and easy to carry out sensing of the object in the pivoting range of the convertible-vehicle top. The pivoting range of the convertible-vehicle top which is to be monitored may also include here components of the top which carry out a movement in relation to one another, for example the above-mentioned bows or roof links in the case of a folding top.

Already existing convertible-vehicle tops can be retrofitted easily and quickly if the field properties used for sensing are ones which the convertible-vehicle top has in any case, for example possibly present magnetization, or are ones which are easily mounted on the convertible-vehicle top without having to significantly change the convertible-vehicle top, for example the application of a voltage to generate a capacitance or a current to generate an inductance. The influence of interference factors such as creepage current and/or short-circuits can easily be eliminated computationally from the sensed signals by a high-power electronic system such as is already available. There is a further degree of freedom for the configuration of the electric field in providing either a purely static field or an alternating field or a combination of a static field on which an alternating field is superimposed. A degree of freedom which is in turn different and is to be optimized with respect to the anti-trapping device is present in the size of the field which is evaluated in order to sense the field. In the case of an electric field, it is possible to sense either the (direct current or alternating current) voltage amplitude and evaluate it or alternatively or additionally the (direct current or alternating current) resistance (ohmic resistance, capacitance, inductance) can be sensed and evaluated. If, in particular, the electrical alternating resistance is sensed and evaluated, it is possible to use, instead of the sensing and evaluation of the amplitude of the alternating resistance, a characteristic variable which is derived from the alternating resistance, for example the frequency detuning described in the prior art when an unexpected object is present in the monitored field.

For example, a magnetic field which permits the movement of the convertible-vehicle top to be sensed may be present and sensed, with the convertible-vehicle top itself acting as a magnet. The convertible-vehicle top with the metallic linkage which forms it and an optional stiffening of the material of the top by means of metallic wires gives rise to a magnetic field as the top moves, said magnetic field also being built up between the top and the bodywork. An object which gets between the top and the bodywork during movement of the convertible-vehicle top disrupts the magnetic field, and the disruption can be sensed as a change in a field property of the magnetic field and in this way an anti-trapping device can be formed by means of a magnetic sensor. If necessary, the metallic components of the convertible-vehicle top can additionally be magnetized in order to amplify the magnetic field and increase the detection sensitivity. Interfering influences from outside the magnetic field which is brought about by the moving convertible-vehicle top may be sensed electronically, for example by measuring and evaluating a reference signal directly before the convertible-vehicle top moves, and used in the evaluation of the sensed signal as a reference and eliminated electronically. As an alternative to the use of the magnetic properties of the material of the convertible-vehicle top, it is possible also to assign to the top a magnet, for example a permanent magnet, whose magnetic field can be used to sense the movement of the convertible-vehicle top. It is to be understood here that the permanent magnet can at least partially magnetize the material of the convertible-vehicle top so that the magnetic field which is evaluated in order to sense the movement of the convertible-vehicle top is composed of the superimposition of the contributions of the permanent magnet and those of the magnetic field of the convertible-vehicle top produced by the permanent magnet.

The inductance of a circuit which is assigned to the convertible-vehicle top can also be provided as a field variable for sensing the movement of the convertible-vehicle top in order to form an anti-trapping sensor. A change in the inductance, for example as a result of an object which has got into the pivoting range of the convertible-vehicle top serves here as a measured variable whose detection allows the control of the convertible-vehicle top to be acted on. A closed circuit, which extends over the convertible-vehicle top, also gives rise to a magnetic field which can be used for evaluation. However, it is also possible to provide for a closed circuit to be formed between the moving convertible-vehicle top and the bodywork so that the object between the convertible-vehicle top and the bodywork influences the inductance of the circuit. For example, convertible-vehicle tops frequently have a clamping bar which rests on the bodywork in the extended position of the convertible-vehicle top and which is pivoted away from the bodywork in order to put down the convertible-vehicle top. A circuit which is formed along the clamping bar over a section of the bodywork and which surrounds the space to be monitored between the clamping bar and the bodywork acts then as an anti-trapping sensor so that a hand which gets between the clamping bar and the bodywork affects the inductance of the circuit by virtue of the fact that, for example, an additional voltage is induced along the circuit. According to Lenz's Law, the sign of the induced voltage is an indication as to whether the object is approaching or moving away; furthermore, the type of object, at least its magnetic and electric properties, can be inferred from the absolute value of the induced voltage. Interference fields which constitute an external, additional inductance can be detected and eliminated by suitable evaluation electronic systems so that a signal which is essentially uninfluenced is evaluated for the anti-trapping sensor.

The field which is to be sensed may also be an optical field, for example a photoelectric barrier, in which "light" can also means electromagnetic radiation outside the wavelength range of visible light. For example, infrared radiation or microwave radiation can also be provided to set up a field between the convertible-vehicle top. In particular in the case of thermal radiation, the top itself forms, owing to its temperature or temperature distribution, a background against which objects which get between the convertible-vehicle top and the bodywork can be sensed with optical means. The contribution of the convertible-vehicle top as a field source of the thermal radiation field can be determined only by sensing the convertible-vehicle top directly before the start of the movement of the convertible-vehicle top and calculating it for the subsequent evaluation. It is to be understood that in addition to or as an alternative to the sensing of the radiation of the convertible-vehicle top itself, it is possible to provide a radiation source which is mounted on the convertible-vehicle top and whose infrared radiation or microwave radiation is sensed continuously during the movement of the convertible-vehicle top and evaluated in order to form an anti-trapping sensor.

Furthermore, it is advantageous to form the field not only as an electric field or magnetic field but also alternatively or additionally as an acoustic field, for example as a radar field or as an ultrasonic sound field, which each have their own field characteristics and determine movements of the top with sensing possibilities. For example, the acoustic signals which are output by the convertible-vehicle top during its movement can be sensed so that an object in the movement range of the convertible-vehicle top at least partially places the acoustic signals in shadow and can thus be sensed. Likewise, an acoustic source, for example a radar source or an ultrasonic sound source, whose signals are sensed during the movement of the convertible-vehicle top can be arranged on the convertible-vehicle top, with an object in the pivoting range of the convertible-vehicle top disrupting the signals and thus being capable of being detected.

The respective field of the abovementioned exemplary fields may be utilized for a method for sensing the convertible-vehicle top which is moved by the drive, and the respective field properties may be tuned with respect to the detection accuracy levels necessary for an anti-trapping sensor.

If the field is embodied as an electric field, specifically as a static or alternating field and if the field variable to be sensed is a capacitance, it is necessary to ensure that the convertible-vehicle top is "insulated" from the surroundings of said top in the sense that, with respect to the surroundings, it has a defined electrical state which can be sensed again by the evaluation unit, if appropriate in each case before the start of the movement of the convertible-vehicle top.

Detection of objects based on a capacitance measurement in the pivot area of the convertible-vehicle top, of this defined electrical state is preferably formed by a contact resistance, with the contact resistance being able to be a direct current voltage resistance or alternating current voltage resistance which occurs wherever the convertible-vehicle top adjoins, for example, the adjoining bodywork and where short circuits can occur between the bodywork and the convertible-vehicle top to which electricity is applied with respect to the bodywork. The contact resistance may be a purely ohmic resistance here, but alternatively a capacitive or inductive resistance or a combination of the aforementioned electrical resistances, for example even what is referred to as an RCL element, is possible.

The defined contact resistance can specifically be formed by an insulator, with the insulator being preferably embodied in a particularly simple form as an insulation film or as an insulation layer which can be manufactured according to various methods, for example spraying, surface coating or other application methods, between the convertible-vehicle top and the parts of the bodywork adjoining the convertible-vehicle top. Alternatively, the main bearing can also be constructed as such in a non-conductive fashion, specifically if the main bearing is formed from, for example, glass-fiber-reinforced plastic or in an electrically insulating fashion by means of encapsulation by polyethylene.

In particular it is advantageous to arrange the insulation film or insulation layer between a main bearing of the convertible-vehicle top and a section of the bodywork which is assigned to the main bearing. In order to form electrodes which are provided only in certain sections on the convertible-vehicle top, it is advantageous to apply electricity to conductive sections of the convertible-vehicle top, in which case it is possible to provide, for example, a wire mesh as conductive sections, which wire mesh is provided in a top cover in order to stabilize the top cover mechanically.

Alternatively or additionally there is preferably provision for sections of the convertible-vehicle top, in particular an inner roof lining of what is referred to as a soft top, to be made conductive so that a planar conductor can also be formed.

According to a preferred embodiment of the invention, a generator is assigned either to the top or to the bodywork, wherein the generator generates a first signal which is received by the evaluation unit assigned to the other of the top and of the bodywork while the signal is influenced on by the transmitting field, where the evaluation unit may determine degree of the influence. The field transmitting the signal may be generated by an object, person or influence as well outside the convertible vehicle as well as inside. In both cases, it could be persons gripping into the top. The evaluation unit carries out an evaluation step detecting a secondary signal characteristic for the generated first signal resulting from a field overlap or influence, in order to determine whether the overlap exceedes a threshold value indicative of a physical interference with the top pivoting range.

These and further advantages and features will become apparent from the embodiments described below.

BRIEF DESCRIPTION OF THE DRAWINGS

Preferred embodiments of a top according to the invention are described below and explained in greater detail with reference to the attached drawings.

FIG. 4a shows a side view of a fourth exemplary embodiment of a system according to the invention.

FIG. 4b shows a plan view of the fourth exemplary embodiment of the system from FIG. 4a.

DETAILED DESCRIPTION OF PREFERRED EMBODIMENTS

Figure 1:
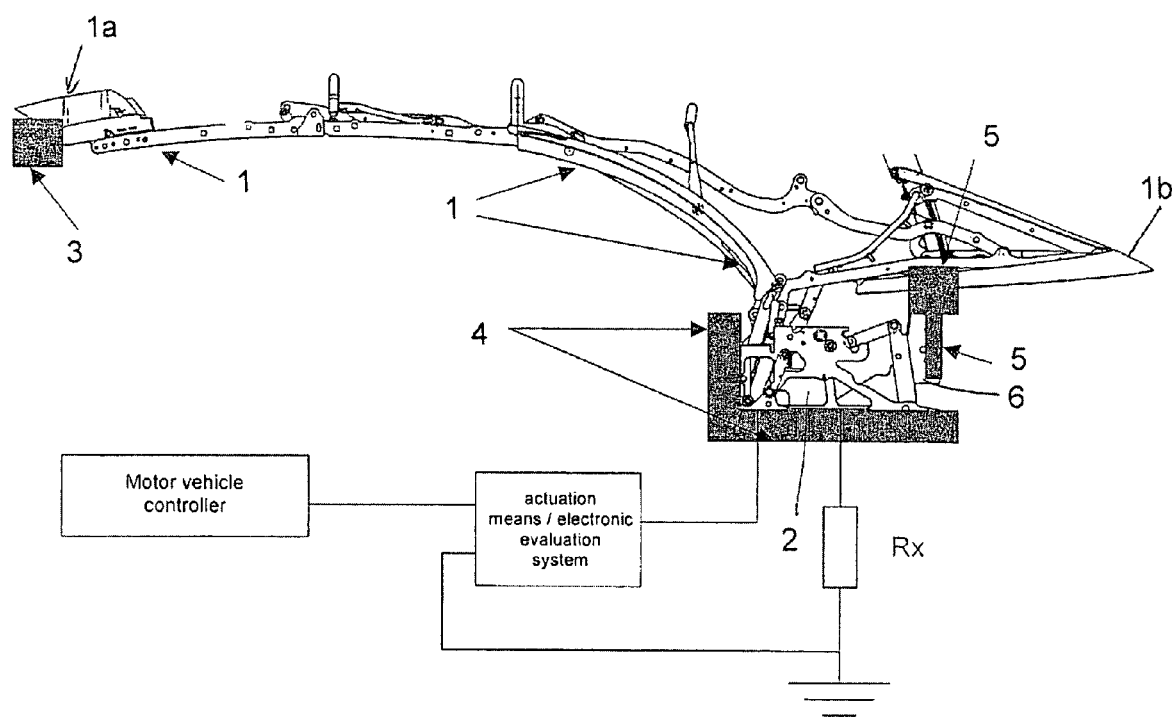
FIG. 1 shows a first exemplary embodiment of a system for sensing an object in the pivoting range of a convertible-vehicle top in a schematic side view.

FIG. 1 shows a top 1 which is attached by means of a main bearing 2 to a bodywork (not illustrated) and is arranged so as to be pivotable with respect to the bodywork. A voltage source (not illustrated) is applied to the top 1, the top 1 being connected as a first electrode to a voltage of approximately several millivolts (with an ampage of approximately 200 milliamperes) compared to a second electrode which is connected to the infinite, to ground. The abovementioned voltage supply can be ensured by means of a simple battery. The entire top 1 which is connected as a first electrode has an insulation (illustrated schematically as gray areas) with respect to the bodywork and owing to the insulation is in a defined electrical state with respect to the bodywork and thus also with respect to ground. The system also comprises an evaluation unit which senses the capacitance of the top 1 with respect to ground and which is operated by the motor vehicle controller. The top 1 as first electrode, the ground as second electrode and the evaluation unit which senses the voltage drop between the two electrodes as an alternating current resistance, possibly also only as a direct current resistance in the form of a capacitance, acts as a sensor for sensing an object which is located between the convertible-vehicle top 1 and the bodywork.

Short circuits to ground occur between the bodywork and ground, and are represented in FIG. 1 by an overall resistance $R_x$, the short circuits to ground being sensed by the electronic evaluation system. The short circuits $R_x$ to ground which are also sensed in the sensed capacitance of the top 1 are corrected in the electronic evaluation system so that, for the actual sensing of the position of the top 1, only a signal which is cleaned of the short circuits to ground and further interference contributions is made available for actuating the movement of the convertible-vehicle top 1, in particular for the open-/closed-loop control of the drive of the convertible-vehicle top 1. The actuation and the electronic evaluation system are combined to form one unit which is switched on and off by the motor vehicle controller.

Figure 1A:
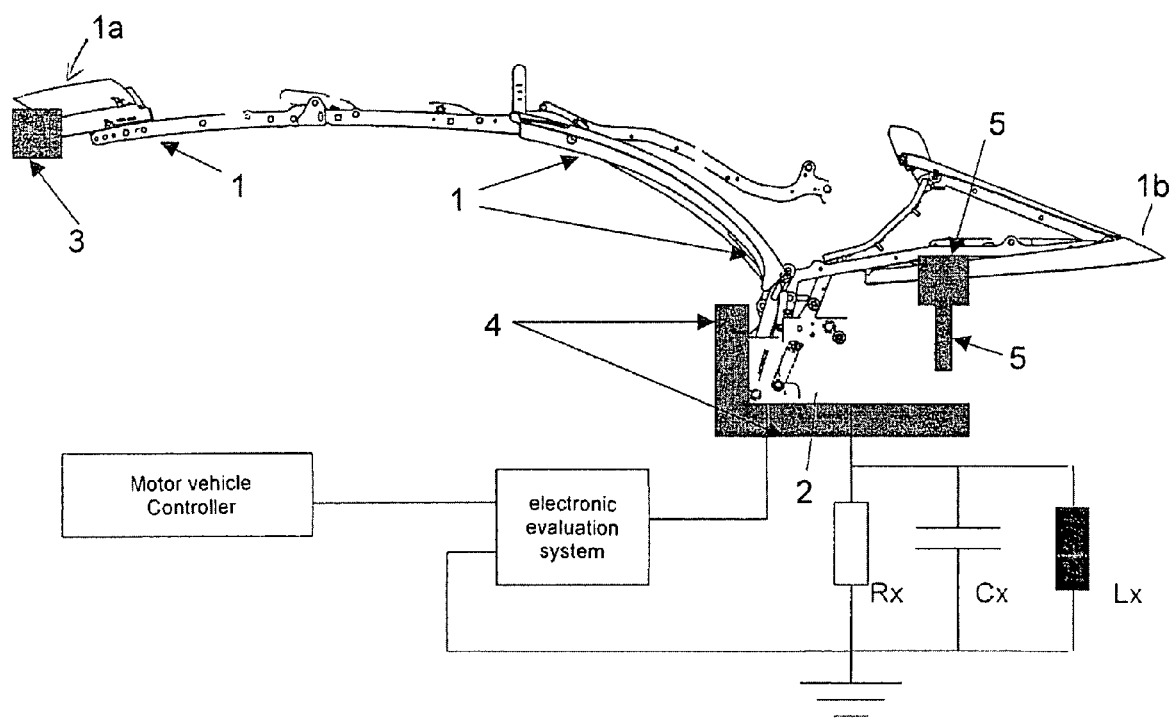
FIG. 1a shows the first exemplary embodiment from FIG. 1 in an extended illustration of the input variables for the evaluation electronics.

FIG. 1a corresponds to FIG. 1 in the arrangement and designation of the components of the convertible-vehicle top 1 but the rear window module 6 from FIG. 1 is not illustrated in FIG. 1a. FIG. 1a shows that the convertible-vehicle top 1 is not characterized exclusively by an ohmic (direct current or alternating current) resistance $R_x$. Capacitances $C_x$ and/or inductances $L_x$ occur additionally. If in particular an alternating voltage is applied, the convertible-vehicle top 1 acts as an oscillatory circuit in the manner of an RCL element whose basic frequency changes when the top 1 moves. In order to sense the movement of the convertible-vehicle top 1, it is possible for the capacitances $C_x$ or the inductance $L_x$ to be sensed and evaluated instead of the ohmic resistances $R_x$ sensed in FIG. 1 or, better still in addition thereto, either to eliminate electronically the undesired shunt resistances in the manner of the short circuit $R_x$ to ground from FIG. 1 or in order to use the capacitances $C_x$ and/or the inductances $L_x$ from the input signal for the electronic evaluation system of the open-/closed-loop control of the convertible-vehicle top 1. It is to be understood here that not only the resistances $R_x$, $C_x$ and $L_x$ have to be evaluated directly but alternatively it is also possible to use the characteristic variable, for example the basic frequency of the RCL element, derived from the abovementioned resistances, for the open-/closed-loop control.

The convertible-vehicle top 1 also comprises a front bow 1a with which it puts down said convertible-vehicle top 1 on a transverse strut of the windscreen, fixed to the bodywork and not illustrated, in an extended position which is illustrated in FIG. 1 and FIG. 1a, and a clamping bar 1b which rests on the bodywork in the extended position. Regions which are relevant for the anti-trapping device are the intermediate spaces between the front bow 1a and the transverse strut of the windscreen or between the clamping bar 1b and the associated section of the bodywork, it being possible for objects whose possible trapping has to be sensed to get into the two intermediate spaces during the movement of the convertible-vehicle top 1 into the illustrated extended position. The convertible-vehicle top 11 is acted on overall with respect to ground because it constitutes a continuous chain of links made of an electrically conductive material.

In FIG. 1 and FIG. 1a it is perceptible in each case that a first insulation 3 is provided on the front bow 1a, and in this context the front bow 1a comprises one or more centering pins (not illustrated) which engage in closures which are provided on the bodywork and are complementary to the centering pins. The convertible-vehicle top 1 also comprises a second insulation 4 which is formed on the main bearing 2 and which electrically insulates the main bearing 2 with respect to the bodywork. The convertible-vehicle top 1 also comprises a third insulation 5 which is provided on a rear window module 6.

Each of the first insulation 3, second insulation 4 and third insulation 5 is embodied as an insulation film. Instead of the insulations being embodied by means of an insulation film, it is possible for them also to be provided, for example, by other means such as vapor deposition with a nonconductive material or surface coating of the corresponding points either of the convertible-vehicle top 1 or of the bodywork.

Overall, owing to the first insulation 3, the second insulation 4 and the third insulation 5 with respect to the bodywork, when the convertible-vehicle top 1 is acted on with respect to ground it acts as a planar electrode whose capacitance with respect to ground changes in a characteristic fashion in the course of the movement of the convertible-vehicle top 1. If an object, for example a hand, gets into the pivoting range of the convertible-vehicle top 1 during the movement of the top, setpoint values are defined in such a way that a specific data record is either stored in the actuation means or the electronic evaluation system of a fault-free movement of the convertible-vehicle top 1, i.e. without an object having got into the pivoting range of the convertible-vehicle top, or is determined directly before the movement of the convertible-vehicle top 1, and thus if an object gets into the pivoting range of the convertible-vehicle top, deviations from the setpoint values which are sensed in the electronic evaluation system or in the actuation means occur so that the actuation means acts on the motor vehicle controller which controls the drive of the convertible-vehicle top 1 in such a way that the drive of the top slows down, is deactivated or reversed in order to prevent the object becoming trapped in the pivoting range of the convertible-vehicle top 1. In a further development, the electronic evaluation system can be configured in such a way that it readjusts the top region which is embodied in certain sections as a sensor. For example, a first spatial region can be monitored, and, if a change in field is detected in the first spatial region, a second spatial region which is closer to the top is monitored with a higher spatial resolution. As a particular embodiment of this subsequent adjustment of the top, it is possible to provide for a direct current voltage field (specifically a static capacitance) to monitor the first spatial region while the second spatial region is monitored by an alternating current voltage field (with a frequency-dependent capacitance). The electronic system ensures that when an object is sensed in the first spatial region, for example the approach of a person to the top to be monitored, in order to subsequently monitor the person the alternating current voltage field is first applied and, for example, an acoustic signal is generated from the frequency-dependent capacitance on the basis of the change in the alternating current voltage field, and the acoustic signal can in particular be provided as an alarm signal. In the example described above, the anti-trapping sensor is "primed" by the switching-on of the alternating current field.

Figure 2:
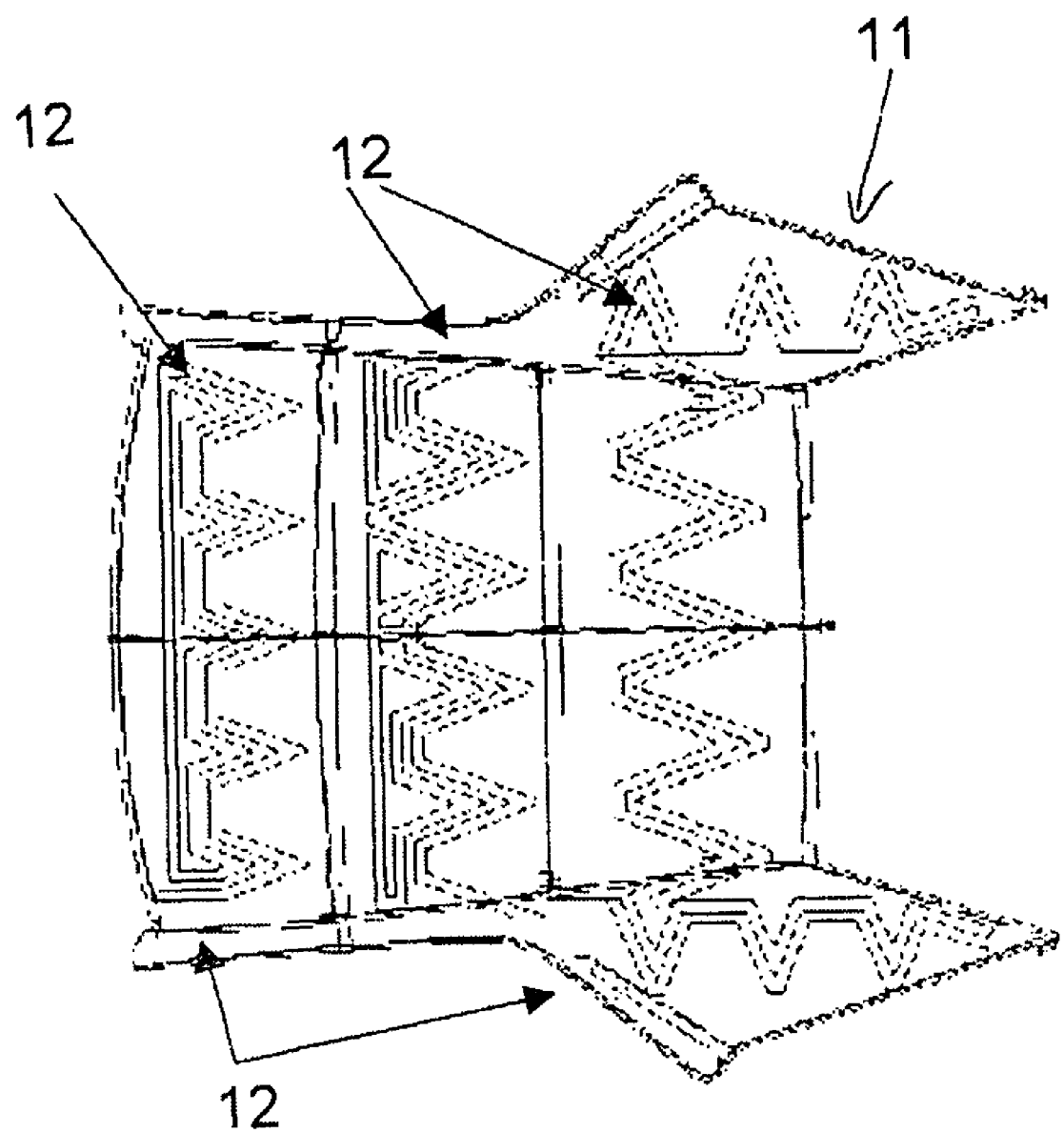
FIG. 2 shows a schematic view of a detail of an inner roof lining of a top as a second exemplary embodiment of a system for sensing an object.

FIG. 2 shows as a second exemplary embodiment a top 11 on which electric conductor tracks 12, which essentially have a fishbone pattern, are provided. The electric conductor tracks 12 are acted on by a voltage source (not illustrated). If the top sheet of the convertible-vehicle top 11 is moved, the current which is closed along the conductor tracks 12 brings about a magnetic field so that the top sheet of the convertible-vehicle top 11 itself is embodied as a field source. The magnetic field can then be sensed by further sensing means (not illustrated) and evaluated later, as explained above with respect to FIG. 1 and FIG. 1a.

FIG. 2 also shows a possible way of forming sections of the convertible-vehicle top 11 as planar conductors on the top sheet of the convertible-vehicle top 11 by means of the electric conductor tracks 12 which have previously served as an alarm film for the purpose of protection against breaking when cutting through the film. In this context, the closed conductor tracks 12 which are restricted to certain sections act as a first electrode of a capacitance whose counterelectrode is located, for example, on the bodywork or is connected to ground. The convertible-vehicle top 11 which is expanded by the planar conductors or the alarm film thus acts, as a further development of the exemplary embodiment illustrated in FIG. 1 and FIG. 1a, as a planar electrode with a particularly good conductive surface. It is to be understood here that the entire convertible-vehicle top 11 can also be embodied so as to conduct over an area, for example by manufacturing the top cover, specifically the inner roof lining, from an electrically conductive material and/or by introducing electrically conductive wires into the top cover, in particular into the insulation layer between individual layers of the top cover.

Figure 3:
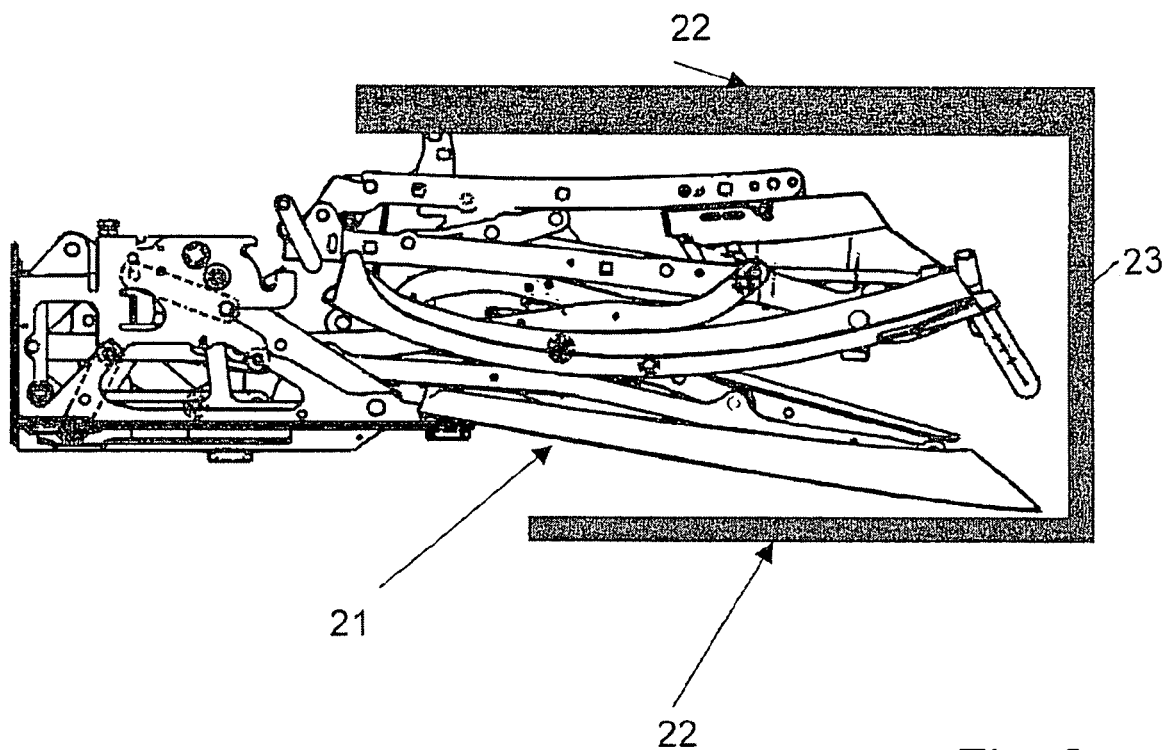
FIG. 3 shows a schematic side view of a third exemplary embodiment of a system according to the invention.

FIG. 3 shows a top 21 which is held in a top box 22 in a stored position. The top box 22 is surrounded on three sides by an insulation 23. The insulation 23 of the top box 22 has the effect that if the top 21 is moved out of the illustrated stored position and there is a collision with the top box 22 owing to a malfunction, there is no short circuit during which the evaluation unit could fail. The fact that the stored top 21 in the top box 22 is also monitored means that an undesired change in the stored top 21 can be sensed. Such an undesired change may be, for example, a foreign body which becomes positioned on or between parts of the stored top 21. An undesired change can also be an accumulation of moisture which could bring about a short circuit to ground when electricity is applied to the stored top 21. The monitoring of the stored top 21 ensures in particular the particularly critical start and end of the movement of the top 21.

FIGS. 4a to 4d each show a top 41 which comprises a main bearing 42 and bows 43, 44, 45 and 46, with the bow 46 being embodied as a front bow. A respective link chain 47 clamps the bows 43 to 46 and a movable top material 49. The gray hatched region 48 indicates in each case which spatial area is respectively monitored by the top 41.

Figures 4A, 4B:
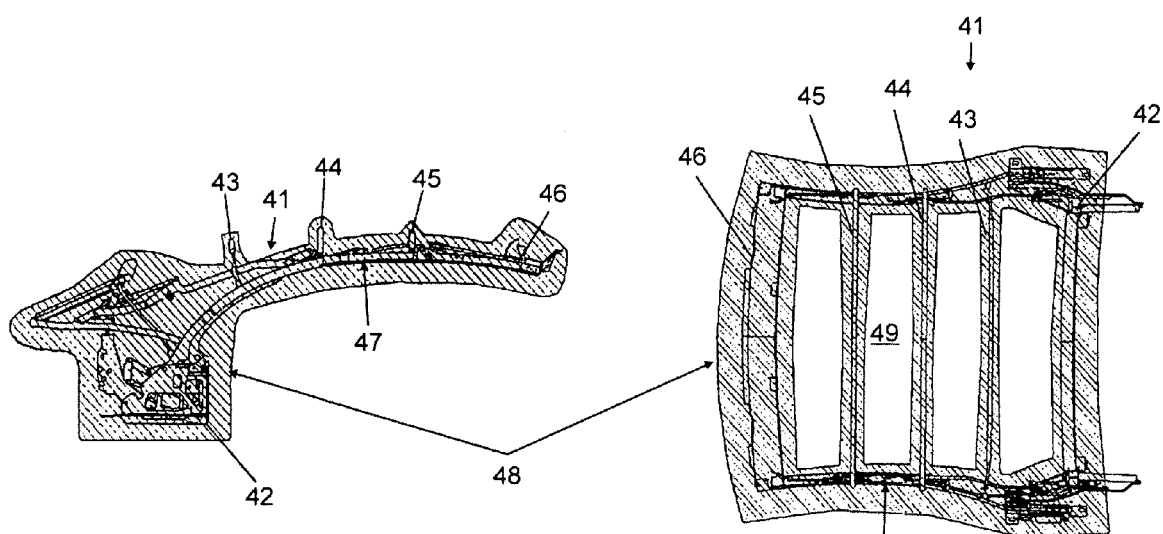

In each case the metallic linkage parts of the link chain 47 and of the bows 43 to 46 of the top 41 are embodied in a metallically conductive fashion in FIGS. 4a and 4b, while the top material 49 is electrically insulating. The monitored region 48 protrudes in each case only slightly beyond the bows 43 to 46, in particular, as is apparent in FIG. 4b, the region between adjacent bows 43 to 46 is not included in the monitoring.

Figures 4C, 4D:
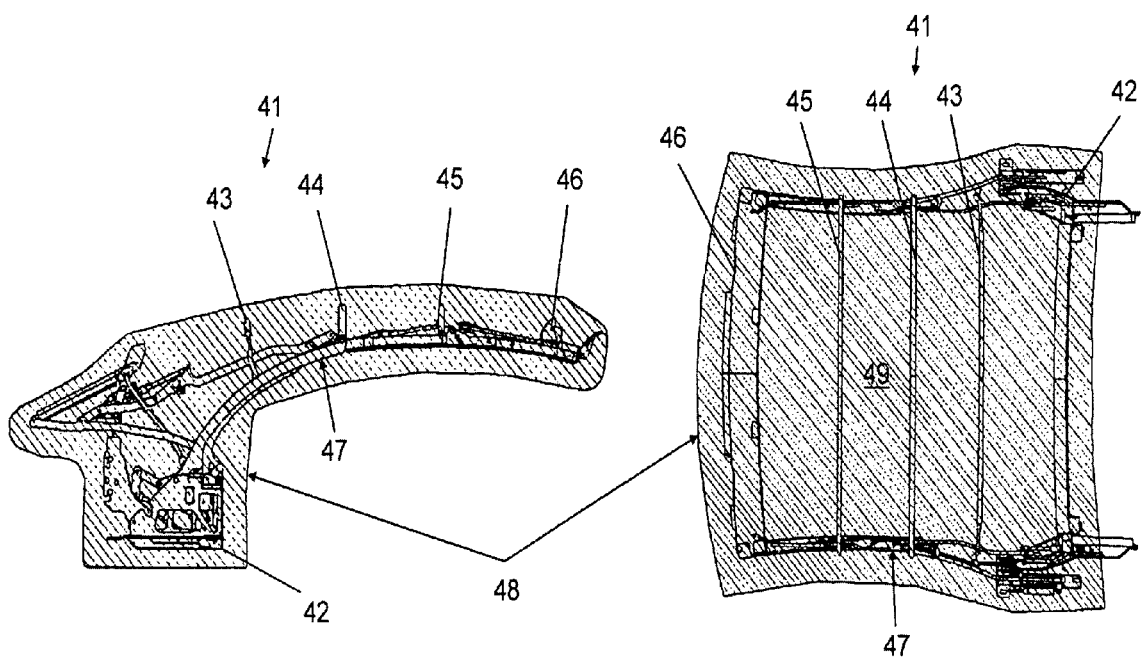
FIG. 4c shows a side view of a fifth exemplary embodiment of a system according to the invention.
FIG. 4d shows a plan view of the fifth exemplary embodiment of the system from FIG. 4c.
Figure 4E:
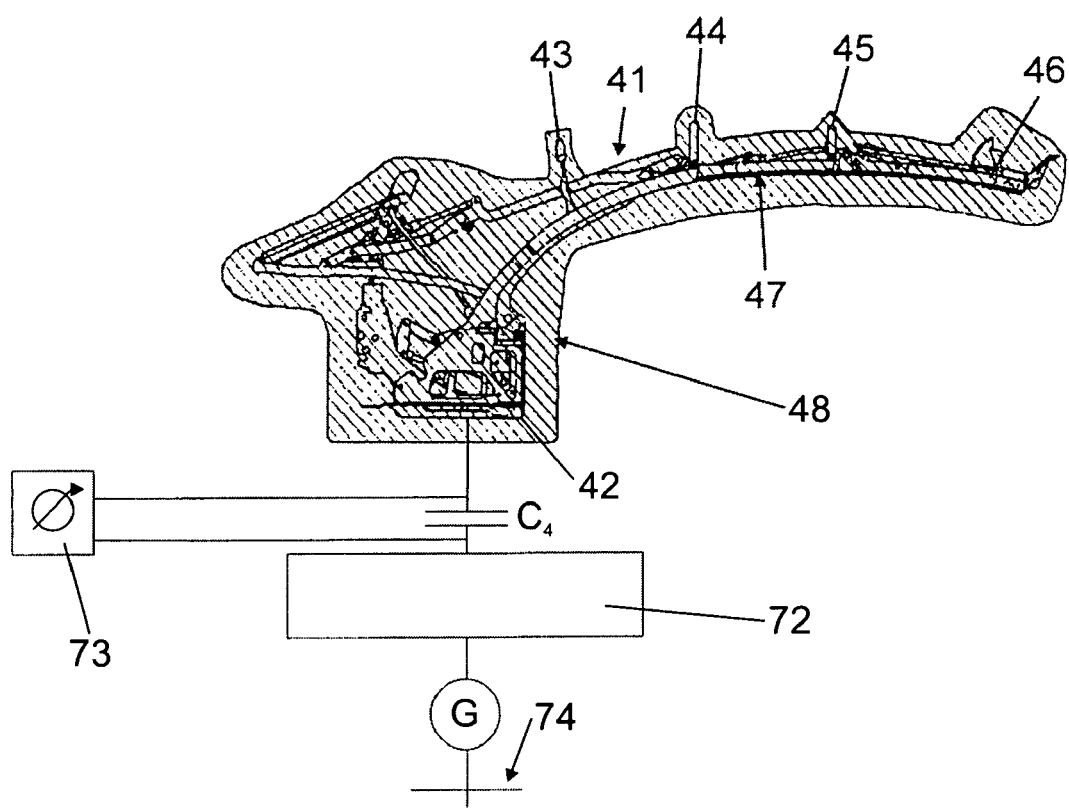
FIG. 4e shows a plan view of the fourth exemplary embodiment of the system from FIGS. 4a and 4b.

FIG. 4e shows top 41 and a bodywork 72 electrically insulated with respect to top 41. A capacitance C4 is provided between the electrically insulated top 41 and bodywork 72, where an evaluation unit 73 detects changements within the pivoting range of top 71. Top 41 is embodied as an electrode and on the bottom side of bodywork 72 is arranged a plate-like and substantially horizontal emitter electrode 74. On the bottom side of bodywork 72 is arranged a plate-like and substantially horizontal emitter electrode 74. Further, a generator G is assigned to the bodywork 72, emitting a signal using the emitter electrode 74, which acts as an antenna.

In FIGS. 4c and 4d, in particular also the top material 49 is constructed in an electrically conductive fashion in addition to the bows 43 to 46 and the link chain 47, with a monitored region 48 which differs from FIGS. 4a and 4b and extends out to a greater degree in spatial terms being produced.

Figures 5, 6:
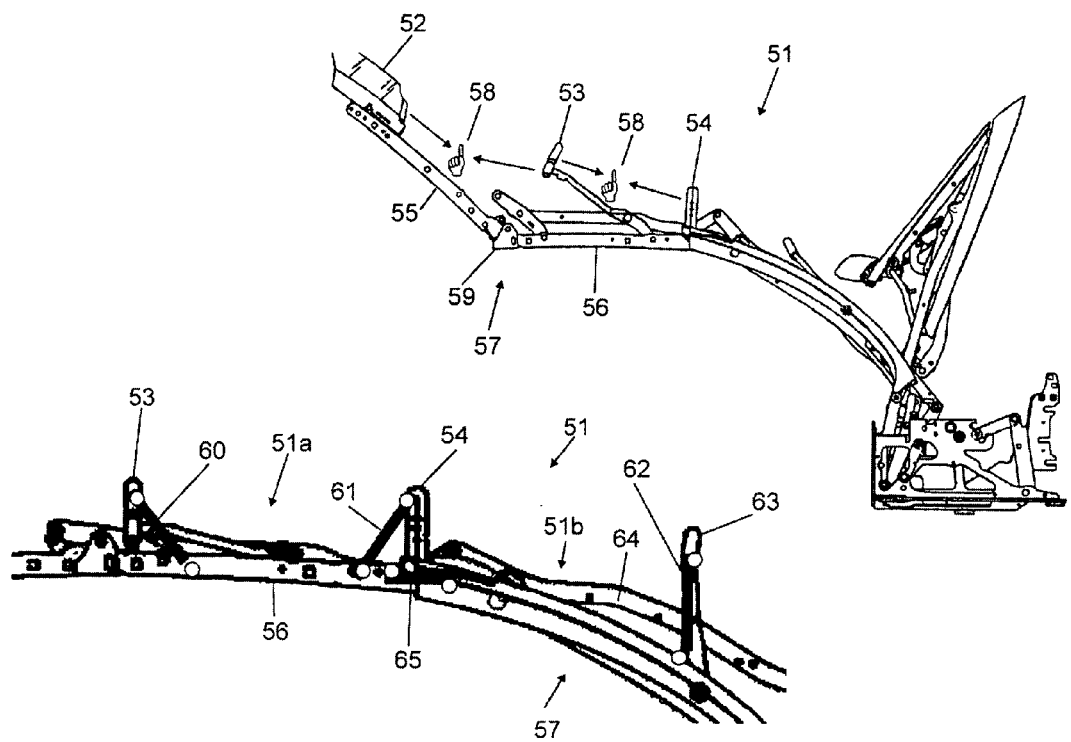
FIG. 5 shows a side view of a convertible-vehicle top from the prior art.
FIG. 6 shows a detail from the convertible-vehicle top from FIG. 5 with a detail of a sixth exemplary embodiment of a system according to the invention.

FIG. 5 shows a top 51 which is embodied as a folding top and which comprises a front bow 52 and further bows 53 and 54. The bows are controlled by a front roof link 55 and a further roof link 56 of a link chain 57. In the illustrated position of the top 51, the movement phase of the storage of the erected top 51 is illustrated, the front roof link 55 pivoting the front bow 52 to the rear and onto the bow 53. In the process, the front bow 52 and the bow 53 approach one another, as do the bow 53 and the bow 54 so that a trapping situation for an object (hand 58) is produced. The front roof link 55 also pivots about a common pivot point 59 onto the further roof link 56 so that a risk of trapping by the roof links 55 and 56 which are moved in the manner of a closing pair of scissors occurs.

FIG. 6 shows the arrangement for the formation of the top 51 as a conductive electrode. For this purpose, the defined section 51a of the top 51 is placed at the same electrical potential by means of a first grounding cable 60 between the bow 53 and the roof link 56 and a second grounding cable 61 between the bow 54 and the roof link 56. A third grounding cable 62 is also provided between a bow 63 and a link 64 of the link chain 57, with the link 64 being constructed so as to be electrically insulated with respect to the adjacent roof link 56 by means of an insulation 65 which is constructed as a non-conductive bushing. A region 51b of the top which comprises the bow 63 and the link 64 of the link chain 57 is thus insulated with respect to the region 51a of the top 51 and can be placed at a different electrical potential for the anti-trapping device. If a difference in potential is produced by applying a voltage between the region 51a and the region 51b, an anti-trapping device can be produced between the regions 51a and 51b by sensing a suitable characteristic variable of the difference in potential.

The invention has been described above by reference to an exemplary embodiment in which the insulation was constructed by means of an insulating film. It is to be understood that the insulation can alternatively or additionally comprise electrically insulating connecting means, in particular threads of screws to which the main bearing 2 on the bodywork is to be attached.

In the exemplary embodiment described above, the short circuits to ground which constituted a fault were sensed at the same time as the capacitance of the top 1 of the electronic evaluation system and are further processed within the electronic evaluation system by the actuation means. It is to be understood that the influences of fault factors such as the aforesaid short circuits to ground are also sensed and processed by a suitable electronic evaluation system so that the signal which is output is processed by the actuation means which is assigned to the motor vehicle controller.

Figure 7:
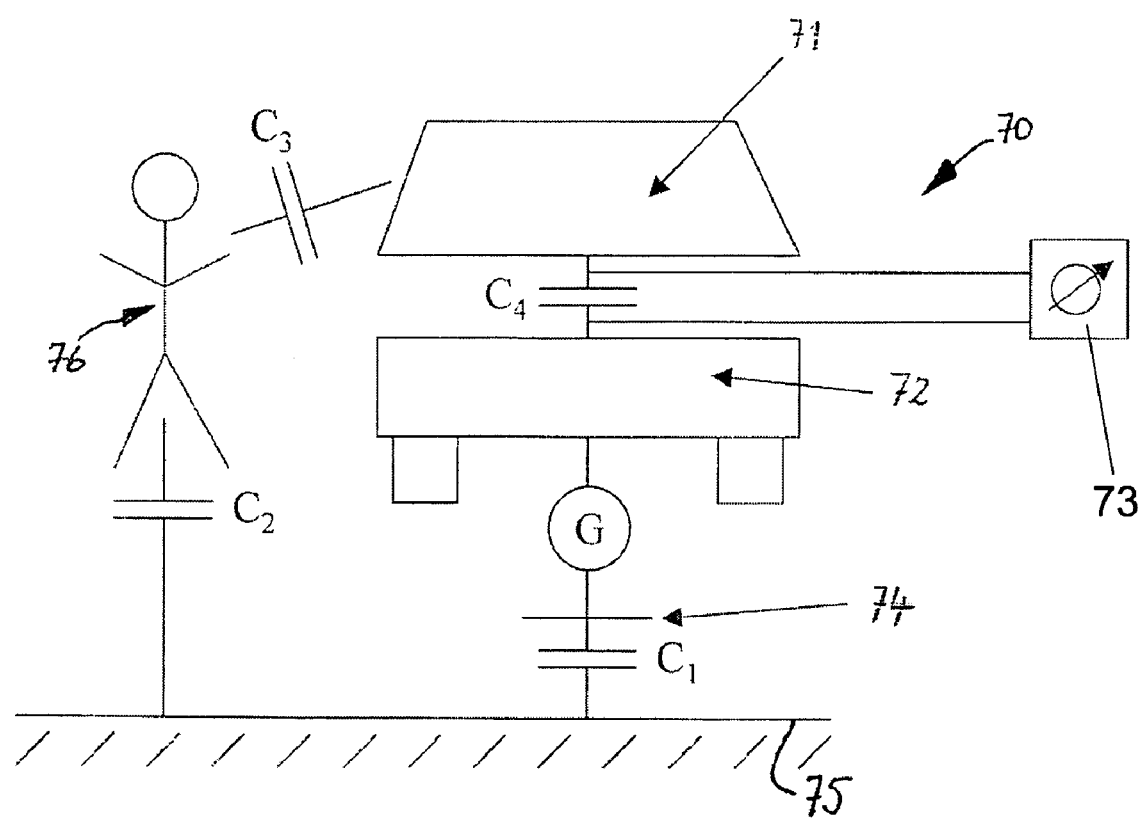
FIG. 7 shows a schematic view of a seventh preferred embodiment according to the invention.

A further preferred embodiment is explained in more detail with reference to FIG. 7. 71 denotes the top, preferably embodied according to one of the preceeding embodiments, and 72 the bodywork of a convertible vehicle 70. A capacitance C4 is provided between the electrically insulated top 71 and bodywork 72, where an evaluation unit 73 detects changements within the pivoting range of top 71. On the bottom side of bodywork 72 is arranged a plate-like and substantially horizontal emitter electrode 74 extending at a distance from a floor 75 defining ground, such that a capacitance C1 is defined between emitter electrode 74 and floor 75. Further, a generator G is assigned to the bodywork 72, emitting a signal using the emitter electrode 74, in the present embodiment a wave of predetermined frequency, being modulated according to a code specific to the vehicle. It has to be untderstood that the wave easily can be replaced by a pulse sequence being emitted, or the like. The type of retained wave will depend upon the selected frequency, e.g. electro-magnetic or ultrasonic.

Even without generated signal, a bothering object or being designated as object in this context, too, and illustrated by a person 76, defining a capacitance C2 between the person's body and the floor, and a further capacitance C3 between the person and top 71. When the person 76 approaches the top 71, or even reaches within the pivoting range of top 71, a changement of the field properties is already detected at evaluation unit 73. But since the evaluation unit 73 will respond to several interactions within the field, a reliable detecting of a dangerous interference is at least hampered, e.g. considering snow precipitation, vicinity of plants reciprocating in the wind, and the like. Such absolute influences might be corrected using differentiation or smoothing processes, but according to the present embodiment, an interference is detected with highest accuracy.

Generator G emits a defined signal using emitter electrode 74. Is, due to an excessive approach of a human being to the top, achieved a field overlap between emitter electrode 74, capacitance C1, floor 75, capacitance C2, person 76, capacitance C3 and top 71, the evaluation unit can detect over capacitance C4 not only a changement of the electrical field, but further a secondary signal being changed by the field overlap, but distinctly linked to the original generated first signal, such that a bridging over a person 76 will be reliably detected, such that a non-relevant bothering will also be disregarded. Accordingly, trusting the absolute secondary signal, a menacing interference can be reliably detected, thus increasing the credibleness of the results of evaluation unit 73. Such field overlap will also be easily detected with respect to a passenger sitting within the vehicle compartment, for which purpose another emitter electrode directed to the vehicle compartment should be provided.

It has to be understood that floor 75 could also be an electrically conductive metal part, and that capacitance C3 could also be defined by an electrically conductive stick, e.g. made of metal, without the recognition of the secondary signal being affected hereby.

It has further to be understood that in an alternate embodiment, the generator G could be assigned to the top, emitting—in several directions—over its conductive componants. A receiver electrode accordingly assigned to the bodywork will then detect the secondary signal evaluated by the evaluation unit. Since the transmission to the floor 75 (ground or earth) enables good results, the generator G preferably will be assigned to the bodywork 72.

In the exemplary embodiment mentioned above, the sensor in FIGS. 1, 1a, 2, 3, 4a to 4d and 5 is based essentially on the sensing of electrical characteristic variables, specifically of a capacitive resistance. It is to be understood that the electrical resistance may either be a direct current resistance or an alternating current resistance. Additionally, an arrangement according to the seventh embodiment of FIG. 7 may be easily combined with any of the embodiments according to FIG. 1 to 6 in order to achieve an improved identification of a field overlap, wherein instead of capacitance, any other of the various field properties cited above can be taken for the evaluation.

As already indicated with respect to FIG. 1a or 2, inductive resistances or magnetic fields which are caused by the closed circuits can also be sensed. With inductive resistances too, it is also possible to sense alternating current resistances as well as direct current resistances.

As an alternative to or in addition to electrical and/or magnetic field variables, it is also possible to form acoustic fields by means of the top and sense them by means of suitable sensors of the respective field variable assigned to the top.

For example, an ultrasonic sound source which is moved with the cover and whose ultrasonic sound signals are sensed by suitable sensors can be assigned to the top. Instead of ultrasonic sound it is also possible to use electromagnetic radiation, for example microwaves or radar radiation to sense the movement of the top, for which purpose suitable sources are to be respectively provided on the top.

It is to be understood that instead of the top in its entirety it is also possible to use parts of the top, in particular covers, the inner roof lining or insulating layers of the top cover for sensing the movement of the top provided that they are correspondingly electrically conductive or can easily be made electrically conductive.

In particular for the inner roof lining it is possible to provide electrically conductive sheets and these may be applied to conventional tops, to flexible sheets in the case of so-called soft tops or to hard tops by, for example, using conductive materials, for example, by means of carbon fibers or by vapor deposition of electrically conductive layers or by weaving in conductive materials, or by providing a second, conductive layer which is embodied as a cable or conductive film.

Insofar as an anti-trapping device for a section of a top and of the bodywork has been described above, it is to be understood that the bodywork also includes windows which could move onto the extended top in a closed position. In this context, a trapping situation may arise if the window pane is raised when the top is extended and there is an object between the upper edge of the window pane and the top. When the section of the top which is assigned to the upper edge of the window pane is connected as a first electrode and there is electrical insulation of the window pane with respect to the associated section of the top it is possible to form a simple anti-trapping sensor here. It is to be noted that the window pane which is constructed from an electrically insulating glass or plastic no longer has to be particularly insulated itself. Insulation could at any rate be provided to insulate the surroundings of the window pane which are fixed to the bodywork or the bodywork as a whole with respect to the top or at least the section of the top which is assigned to the window pane. In particular, the described anti-trapping device can also be extended to windows. An anti-trapping sensor which functions in particular as a window anti-trapping device and can be particularly set to this function on a case-by-case basis can be specifically formed by suitably arranging an electrical insulation between the section of the top which is assigned to the window pane and the bodywork.

What claimed is:

1. A system for sensing an object in the pivoting range of a top for a convertible vehicle, the system comprising
at least one first electrode for sensing field properties of a field which is assigned to the top, and
an evaluation unit for evaluating the sensed field properties,
wherein, at least in certain sections, the top for the convertible vehicle is designed directly as one of the at least one first electrode,
wherein a second electrode is formed by a bodywork of the convertible vehicle,
wherein the section for the top of a convertible vehicle which is designed as the at least one first electrode has, with respect to the surroundings, a defined electrical state which can be sensed by the evaluation unit, and
wherein the evaluation unit is adapted to sense the defined electrical state by measuring an electrical voltage between the at least one first electrode and the second electrode.

2. The system as recited in claim 1, wherein the defined electrical state is embodied as a contact resistance.

3. The system as recited in claim 2, wherein the defined electrical state is embodied as an insulator.

4. The system as recited in claim 3, wherein the insulator is embodied as an insulation film or insulation layer, and wherein the insulation film or insulation layer is arranged between the top of the convertible vehicle and the adjacent part of the bodywork.

5. The system as recited in claim 4, wherein the insulation film or insulation layer is arranged between a main bearing of the top of the convertible vehicle and the section of the bodywork which is assigned to the main bearing.

6. The system as recited in claim 1, wherein conductive sections are assigned to the top, and wherein electric current is applied to the conductive sections.

7. The system as recited in claim 6, wherein the conductive sections are embodied as wire mesh in a top cover.

8. The system as recited in claim 6, wherein the conductive sections are embodied as planar conductors.

9. The system as recited in claim 8, wherein the planar conductors are arranged on the top cover.

10. The system as recited in claim 1, wherein the convertible vehicle further comprises a bodywork, said bodywork being electrically insulated with respect to said top, and wherein a generator and an antenna is assigned to said bodywork.

11. The system as recited in claim 10, wherein the antenna is embodied as a plate-like emitter electrode.

12. The system as recited in claim 11, wherein the generator generates a signal, and wherein the signal is sensed by the evaluation unit as it is transmitted.

13. The system as recited in claim 12, wherein the signal is transmitted using a frequency, the frequency being modulated such that an identification is possible.

14. The system as recited in claim 12, wherein the signal is a pulse sequence, the sequence corresponding to a predetermined integer value.

15. The system as recited in claim 12, wherein the evaluation unit is adapted to recognize said signal when the top is influenced by a field transporting said signal.

16. A system for sensing an object in the pivoting range of a top for a convertible vehicle, the system comprising
a field which is assigned to the top,
a sensor which senses properties of the field, and
an evaluation unit for evaluating the sensed field properties,
wherein the top for the convertible vehicle is embodied at least in certain sections as a field source, said sections forming at least one first electrode,
wherein the field source can be sensed by the sensor while the top is pivoting,
wherein a bodywork of the convertible vehicle forms a second electrode, and
wherein the evaluation unit is adapted to evaluate the field properties by measuring an electric voltage between the at least one first electrode and the second electrode.

17. The system as recited in claim 16, wherein the field is a magnetic field.

18. The system as recited in claim 17, wherein the top for the convertible vehicle has magnetic properties at least in certain sections.

19. The system as recited in claim 17, wherein the top for the convertible vehicle supports a magnetic arrangement.

20. The system as recited in claim 16, wherein a circuit is assigned to the top for the convertible vehicle, and wherein the inductance of the circuit can be sensed.

21. The system as recited in claim 16, wherein a microwave source is assigned to the top of the convertible vehicle.

22. The system as recited in claim 16, wherein the field is an acoustic field.

23. The system as recited in claim 22, wherein an ultrasonic sound source which is arranged on the top is assigned to the top of the convertible vehicle.

24. The system as recited in claim 22, wherein a radar source which is arranged on the top is assigned to the top of the convertible vehicle.

25. The system as recited in claim 16, wherein the convertible vehicle further comprises a bodywork, wherein a generator producing a signal is assigned to one of said bodywork and said top, and wherein a field influenced by said signal is detected by the evaluation unit.

26. The system as recited in claim 25, wherein said influenced field comprises an object or a person interfering with the top pivoting range.

27. The system as recited in claim 25, wherein said generator is assigned to the bodywork, and wherein the signal is emitted using a plate-like emitter electrode.

28. The system as recited in claim 25, wherein said signal includes a distinct sequence identifying the vehicle.

29. A method for sensing a top of a convertible vehicle which is moved by a drive, comprising the steps:
providing a field between at least one first electrode assigned to a top of a convertible vehicle and a second electrode formed by a bodywork of the convertible vehicle,
sensing of the field between the at least one first electrode and the second electrode during movement of the top of the convertible vehicle,
adjusting of the sensed characteristic variables to setpoint values, and
acting on the drive as a function of the sensed characteristic variables of the field and of the setpoint values.

30. The method as recited in claim 29, wherein the field is an electrical field or magnetic field.

31. The method as recited in claim 29, wherein the field is an acoustic field.

32. The method as recited in claim 29, wherein one of said bodywork and said top emits a signal characterizing said vehicle, wherein a secondary signal distinctly related to said emitted signal is received by the other of said bodywork and said top, wherein a field transmits said secondary signal, and wherein said adjusting step comprises calculating a critical field overlap indicative of a possible interference of an object with the top pivoting range.

33. A method for evaluation of an indirect field influence between a top and a bodywork of a convertible vehicle, said top and said bodywork being electrically insulated with respect to each other, the top being assigned at least one first electrode and the bodywork being formed as a second electrode, comprising:
producing a first signal indicative of said vehicle with the second electrode and a generator assigned to said bodywork,
evaluating, with an evaluation unit assigned to said top, a field interaction responsive to a detected secondary signal indicating a change in field properties of the at least one first electrode correlative to said first signal to determine a possible interference between an object not belonging to the vehicle and a pivoting range of said top.

* * * * *